United States Patent [19]

Sykes

[11] Patent Number: 5,509,966

[45] Date of Patent: Apr. 23, 1996

[54] GRAPHIC ARTS MATERIAL EXTRUSION DEVICE

[76] Inventor: Richard H. Sykes, 3823 N. Marshfield, Chicago, Ill. 60613

[21] Appl. No.: 142,791

[22] Filed: Oct. 22, 1993

[51] Int. Cl.⁶ .............................. B05C 11/00; B05C 5/00; B05B 9/04
[52] U.S. Cl. .................. 118/697; 118/323; 118/315; 118/410; 395/103
[58] Field of Search .................................. 118/697, 323, 118/315, 407, 410, DIG. 2; 395/103; 222/95, 104, 386, 571

[56] References Cited

U.S. PATENT DOCUMENTS

| | | | |
|---|---|---|---|
| 3,601,590 | 8/1971 | Norton | 395/103 |
| 4,049,158 | 9/1977 | Lo et al. | 222/95 |
| 4,136,802 | 1/1979 | Mascia et al. | 222/95 |
| 4,564,410 | 1/1986 | Clitheros et al. | 118/697 |
| 4,584,964 | 4/1986 | Engel | 118/697 |
| 4,692,351 | 9/1987 | Maeda et al. | 118/697 |
| 4,743,465 | 5/1988 | Saeki et al. | 118/410 |
| 4,872,417 | 10/1989 | Kuwabara et al. | 118/697 |
| 4,941,428 | 7/1990 | Engel | 118/697 |
| 4,964,068 | 10/1990 | Matsushita et al. | 395/103 |
| 4,967,933 | 11/1990 | Maiorca et al. | 118/697 |
| 4,979,380 | 12/1990 | Robbins et al. | 118/697 |
| 5,336,349 | 8/1994 | Cornils et al. | 118/697 |

OTHER PUBLICATIONS

"Home Decorating with Liquid Glass Stains" No. 41, 19 of 27 pages, Deco Glass by Titan/Slomons, documentation believed to predate filing date by more than one year.
Decraled Limited documentation, 4 pages, published by Decra–Led, P.O. Box 217, Portagem WI 53901, 1989.
"Overlay," Stained Glass Overlay Inc documentation, 12 pages, 1990.
"Creating with Stained Glass," No. 30–13802, 54 pages, published by Gick Publications, 1976.
"Home Decorating with Liquid Glass Stains," 3 pages, documentation published by Deco Glass (Titan/Slomons) 1981.
"Create the look of stain glass the easy two–step method," 7 pages, documentation published by Deco Glass, predated filing date by more than one year.
"Glass Art Industrial Price List", 5 pages, published by Jurgen Industries Inc., 1202 Chestnut, Unit 2, Everett, WA 98201, effective Mar. 1, 1992.
"Precision Valve Where Precision Meets Production", 2 pages, specifications, published by Precision Valve, 877 25th Street, Watervliet, NY 12189, predates filing date by more than one year.
"High Productivity Computerized Sign Making system for Sign Routing and Engraving," 1 page, published by Techno isel U.S.A. Division, 2101 Jericho Turnpike, Box 5416, New York Park, NY 11042–5416, predated filing date by more than one year.

Primary Examiner—David L. Lacey
Assistant Examiner—Steven P. Griffin
Attorney, Agent, or Firm—Fitch, Even, Tabin & Flannery

[57] ABSTRACT

A computer aided design and manufacturing system for decorating glass and other objects using graphic arts extrusion (GAME). Adhesive material combined with pigments adding false metal coloring and thicotropic properties for application upon glass and other objects is performed to provide false metal bead lines simulating stained glass and camed glass panels. A conventional x-y plot table is equipped with a specially designed nozzle for extruding materials and a computer is provided for controlling the plot table. The computer allows for flexibility in altering designs and enables operators or artisans to develop intricate detailed designs. Multi-dimensional ridges formed on decorative objects are made in the form of patterns which are filled in with colored varnishes or lacquers to fake a stained glass appearance.

12 Claims, 11 Drawing Sheets

GRAPHIC ARTS MATERIAL EXTRUSION DEVICE

BACKGROUND OF THE INVENTION

The present invention relates to processes and apparatus for decorating a surface and more particularly to a computer aided design and manufacturing system for decorating glass using apparatus to extrude compositions which adhere to and decorate a surface.

Decorative stained glass and came glass pieces have been made by artisans for many hundreds or even thousands of years. In doing so, the artisans' work is laborious and time-consuming. Accordingly, over the years there have been developed methods for creating faux stained glass and came glass without actually cutting and soldering the glass pieces (lites or gems) together. Such approaches include the use of lead or other material in tape form having adhesive for placement upon glass plate. Alternatively, extrudable liquids or paste-like substances have been utilized for creating false lead lines, which material is often referred to as liquid lead or liquid pewter or the like. Methods using the liquid metals approach are often referred to as trace and flow methods. Other "liquid" metals besides lead or pewter are also desirable, such as fake gold or bronze, for use in decorative stained glass or came glass windows.

Once lead lines are established with a bead of flowable liquid metal or metal-like material to create patterns on glass, glass stains, varnishes or lacquers are applied to simulate a stained glass appearance. While the trace and flow method for making decorative glass objects is much less time-consuming than assembling and soldering together came and glass or camed stained glass, the trace and flow method is still a labor intensive approach which does not lend itself well to the mass production of decorative objects. Accordingly, it would be desirable to provide processes and apparatus which minimize the manual labor required for producing decorative objects through means of extruding liquids and other materials. It would be further desirable to provide computerized apparatus for graphic arts material extrusion using a computer driven x-y plotter to apply a bead lead line to a surface to be decorated and subsequently apply lacquers or stains onto outlines defined thereon. Such a computer aided design apparatus or computer aided robotic graphic arts material extrusion device would significantly automate the process of making false stained or camed glass. Further, such methods and apparatus may also be desirable for the manufacture or assembly of real stained glass or camed glass.

SUMMARY OF THE INVENTION

In accordance with the present invention, a computer controlled graphic arts material extrusion device and materials for use therewith is employed using a unique methodology of applying a three dimensional artistically and constructively significant media onto a generally flat surface of various type materials (e.g., glass, ceramics, plastics, wood, metal, fabric, paper, etc.) which may be further decorated with a broad range of flowable materials (e.g., epoxies, lacquers, acrylics, varnishes, polyesters, silicones, frit, cyanoacrylate, powdered metals, inks, etc.) which range in viscosity from high viscosity paste-like media to low viscosity pourable media.

The preferred system for carrying out the present invention utilizes graphic arts material extrusion (GAME) technology unique to the present invention comprising a plot table, a pressurized thicotropic substance and a nozzle for extruding the thicotropic substance onto a supported surface media decorating the same in multiple dimensions. As used herein, "thicotropic" refers to a substance's properties relating to its thickness, plasticity and viscosity allowing the substance to take on a multi-dimensional shape (e.g., standing up and away from a surface in the z-axis). Accordingly, such thicotropic substances are extrudable into decorative designs, e.g., faux stained or camed glass.

A computer or microcontroller may be used to control the extrusion and movement of the nozzle, or movement of the target surface in relation to the nozzle, which facilitates quick and accurate depositing of material on the surface, allowing for the mass production of decorated objects. One such multi-dimensional extrusion upon the surface media comprises an extruded bead line or barrier of false lead and a coating material. The relationship between the extruded barrier and the coating material is necessary in a number of applications where one seeks to duplicate a stained-glass appearance for glass products and other decorative objects in, for example, the door and window industry or, in the case of metal decorated products for simulating cloisonne.

An object and advantage of the GAME device, processes used thereon and decorative objects manufactured thereby include, among other things, the ability to make decorative glass objects which avoid the use of a separate grid overlay faux metal came system requiring that the grid side or sides be encapsulated into a multi-panel glass unit, whereas the GAME material bonds permanently and directly to the decorative glass, eliminating the necessity of an additional protective glass sheeting.

Another object of the invention is the use of high-bond material improving the strength of a V-notch groove in a glass lite unit where a ground-out trench is weakest.

A further object of the invention is the provision of a computer system for flexibility, eliminating hard tooling and fixtures, thereby allowing for frequent and inexpensive design changes and further allowing for the development of highly complex patterns which otherwise would not be possible with conventional came framing systems.

A still further object of the GAME approach using high bond material not only creates faux stained and beveled camed glass panels but is an entirely new methodology for replacing the metal came frame structure with an on-site, direct-deposit true structural framing system made from extrudable materials. Furthermore, the bond strength of an extruded frame system may exceed the traditional metal came frame system.

Another object of the present invention is to provide extrudable or other direct-deposit inks/coatings which can perform a series of glass treatments, all as part of a single application process which is currently not available in the glass marketplace.

The foregoing objects and advantages of the present invention, and additional objects and advantages which will become apparent in the Detailed Description and drawings, are achieved with the graphic arts material extrusion device according to the invention. Such graphic arts material extrusion devices as described herein comprise a plot table, a container for maintaining a thicotropic substance under pressure and a nozzle connected to the container for extruding the pressurized thicotropic substance contained therein. The plot table supports a surface below the nozzle, allowing the surface to be decorated thereby. The nozzle is operably mounted at the plot table whereby the plot table is capable of controlling the movement of the nozzle in the X and Y directions along the supported surface, depositing the thicotropic substance thereon in multiple dimensions. A graphic arts process in accordance with the present invention for decorating a surface comprises the steps of providing an adhesive fluid, adding a pigment to said fluid thereby providing an extrudable thicotropic substance, pressurizing the thicotropic substance and depositing the thicotropic substance on the surface to be decorated, forming a multi-dimensional ridge thereon. Decorative objects produced with the above described device and process comprise a surface medium, a thicotropic substance comprising an adhesive fluid and a pigment for coloring the adhesive fluid and for providing thicotropic properties thereto, the thicotropic substance being affixed upon the surface medium, forming a multi-dimensional ridge thereon. In an embodiment, the plot table is intended to be computer controlled, allowing for quick and flexible manufacture of decorative objects. Adhesive fluids and thicotropic substances may be altered as described in the discussion which follows to achieve particular desirable properties, the technique according to the present invention, however, is not intended to be limited to the described relationship of the coating and extruded media.

DETAILED DESCRIPTION OF THE PREFERRED EMBODIMENT

As shown in the drawings for the purposes of illustration the present invention concerns graphic arts material extrusion (GAME) techniques as embodied in system 10 which comprises a CalComp 748 high speed drafting table, plot table 12 and a CalComp 925 controller, controller 36. The controller 36 communicates with the plot table 12 via its interface card with electrical connections 38.

The CalComp equipment utilized in the embodiment described herein is older equipment which has since been obsoleted but found useful as modified for the purpose of a graphic arts material extrusion system in accordance with the present invention. The CalComp equipment was modified by the removal of its reel-to-reel tape system and the equipment was subsequently upgraded through the use of an interface card which allows the controller 36 to communicate directly with an on-line computer system 42 via a translator program associated with a plot file program. The interface card used between the controller 36 and the computer system 42 was developed in cooperation with the manufacturers of the CalComp equipment. Such interfacing techniques are well known and merely eliminate the need for reel-to-reel tape storage and provide for the replacement thereof with the computer system 42.

Figure 4:
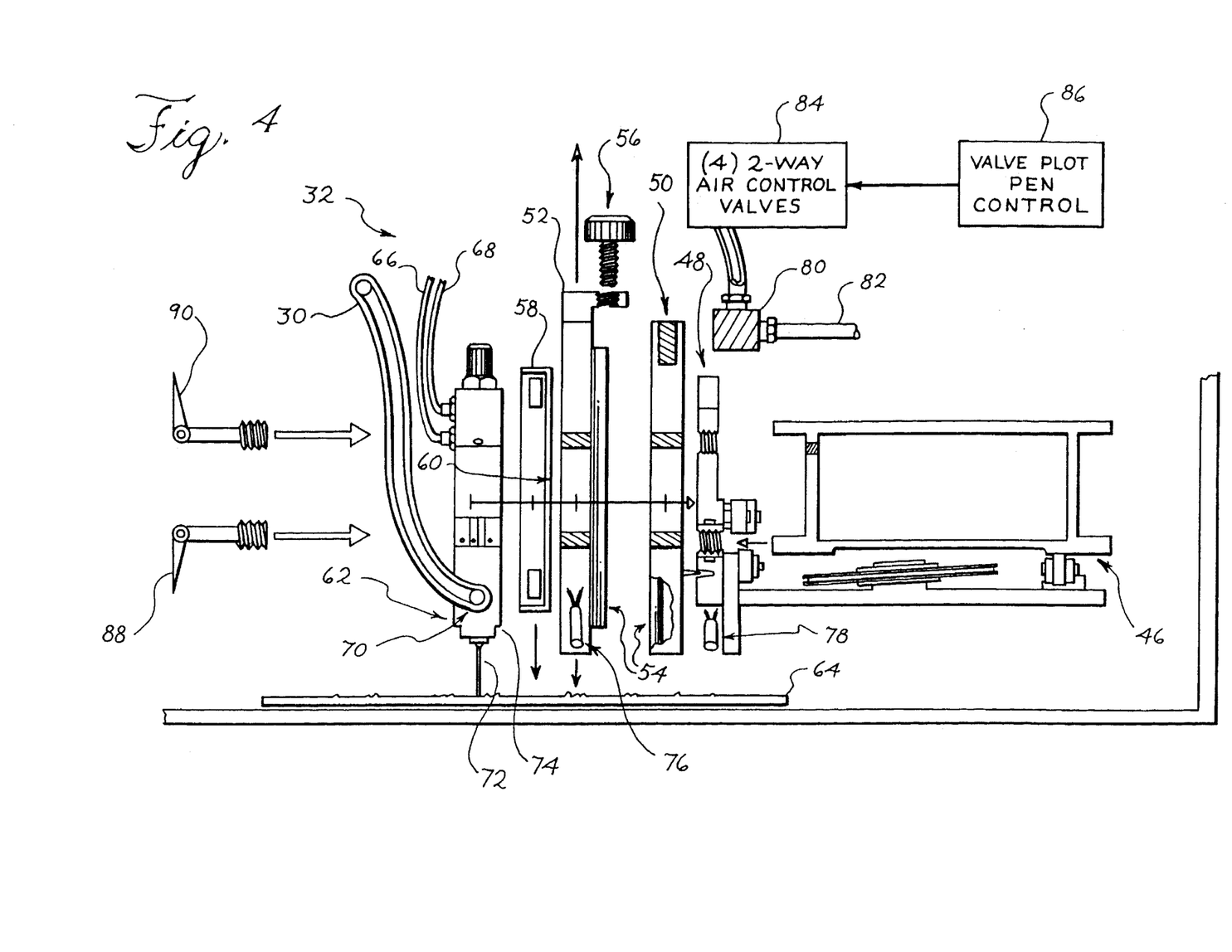
FIG. 4 is an exploded view of a plot head dispensing tool or nozzle used in a valve assembly.

Instructions are then read from the computer system 42 to a program which translates plotting instructions read from conventional off-the-shelf CAD software, allowing execution of the plotting instructions by the CalComp controller 36° The CalComp 748 high speed drafting table was further modified for the purposes of the present invention by removing its original plotter head, the original pen-and-ink system and replacing the same with a valve control system 32 which will be described further in conjunction with FIG. 40

Various extrudable materials for use by the system 10 are supplied through an Alloy Products ASME 316 stainless steel pressure pot 14 and TEFLON (polytetrafluoroethylene) feed lines 18, 20, 22, 28 and 30, which are designed to have a seamless path even when couplings are used as will be discussed further in conjunction with FIG. 9. The pressure pot 14 is shown in cross section in FIG. 8 and will be described more fully in the discussion that follows.

Figure 1:
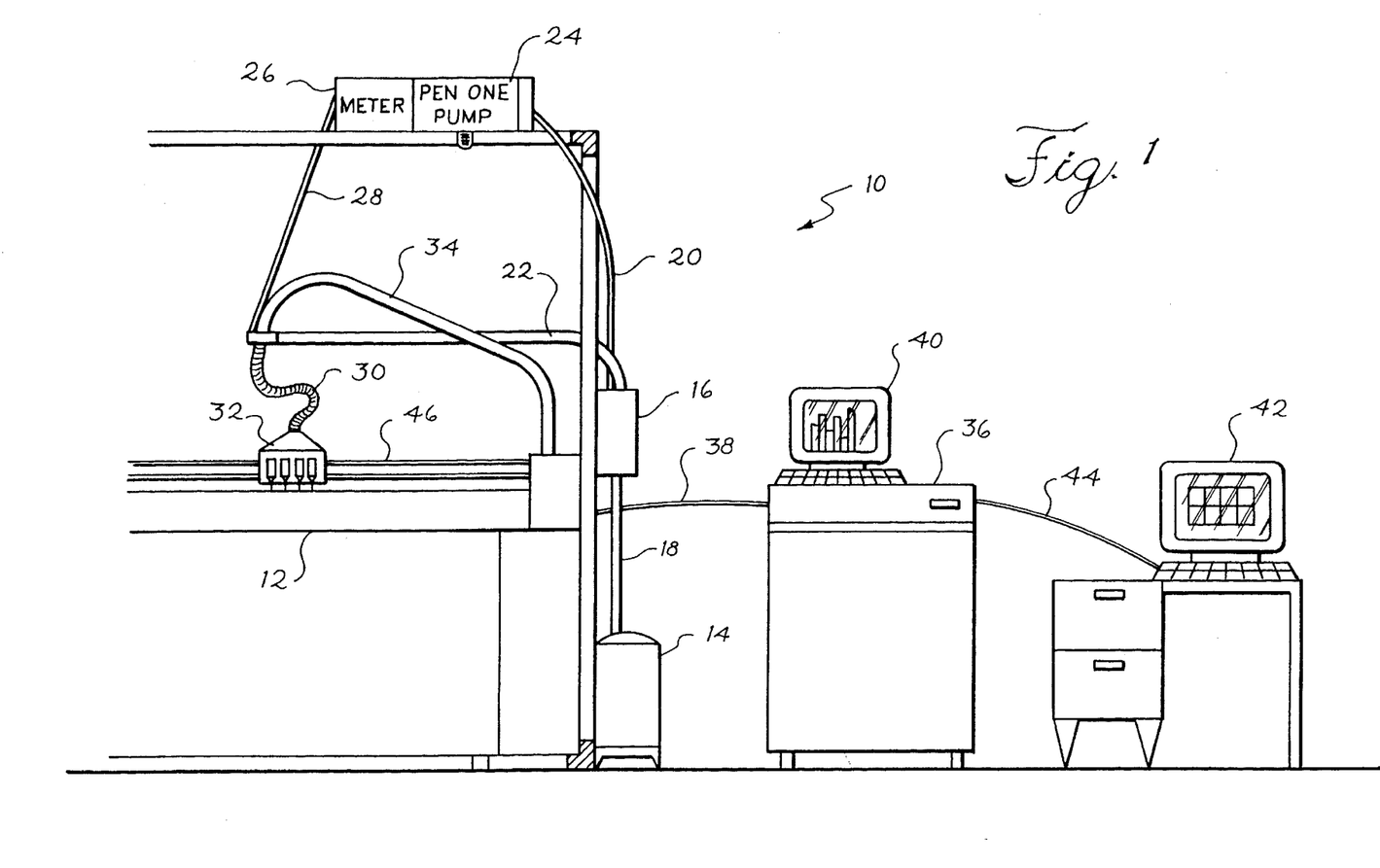
FIG. 1 is a view of a GAME system having a plot table, a controller and a design and production control computer.

The GAME system 10 as shown in FIG. 1 also utilizes a GAME design and production controller computer 42 which is connected to the controller 36 via signal path 44. Whereas the computer system 40 is merely a programmable pump control system slaved to the plot table 12, the GAME design and production control computer 42 provides the real man-to-machine interface employed by the system 10. The computer 42 may be further equipped with a scanner for scanning images into the computer 42, transferring such images to the controller 36 for plotting by the plot table 12. Various design modifications and experimentation are easily facilitated by the computer 42, which provides the flexibility desired and needed for artisans and others using graphic arts material extrusion.

The pressure pot 14 supplies pen-one of the valve assembly 32 via pen-one pump 24 and meter 26 which receive pressurized material for extrusion at pen-one via feedlines 18, 20, 28 and 30. Used with the pump 24 for encoding, is Dynamics Research Corp.'s #35 rotary encoder with EE external autophase slope error compensation electronics. The meter 26 is a Max Positive Displacement low flow meter. Micropump volumetric metering pumps 16 are used for pen-two, three and four in the z-axis controlled which further control the valve assembly 32 via line 22. The pumps 16 are magnetically coupled gear pumps with motor encoder units. Valve assembly 32 represents an output device including dispensing valves, sensors, locators, actuators and the like. The valve assembly 32 is mounted on a boom 46 provided on the plot table 12.

Figure 2:
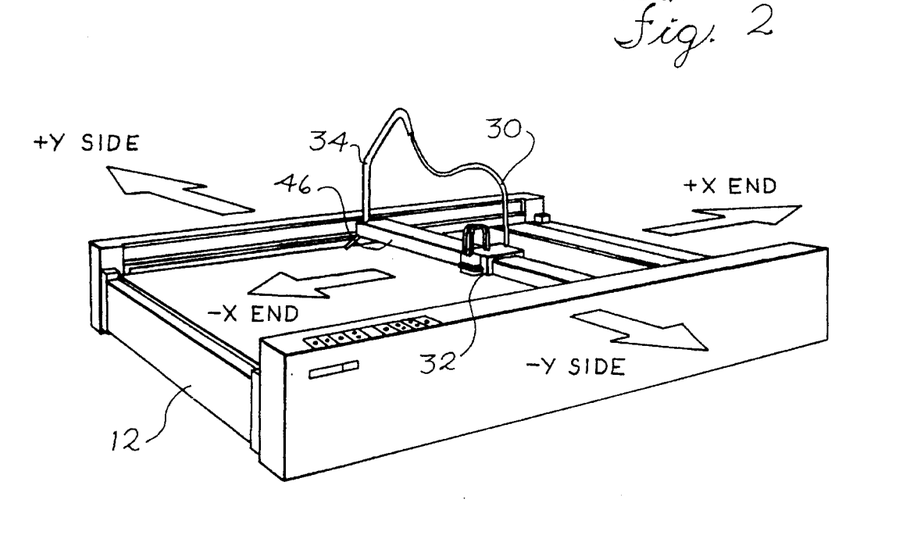
FIG. 2 is a perspective view of a plot table used for graphic arts material extrusion in accordance with the present invention.
Figure 3:
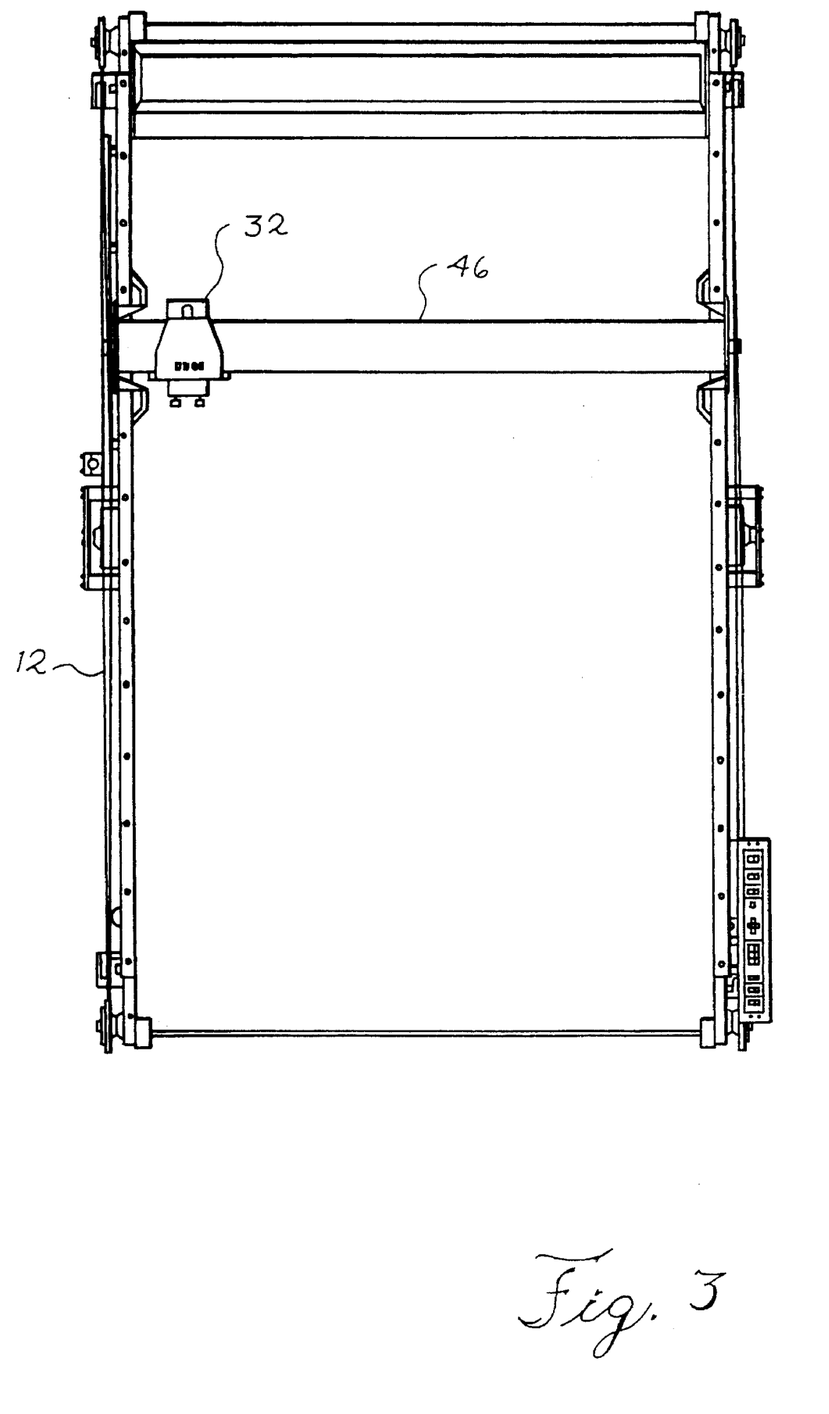
FIG. 3 is a plan view of the plot table of FIGS. 1 and 2.

With reference to the plot table 12 as shown in FIG. 1 and shown in perspective in FIG. 2, and further shown in a plan view in FIG. 3, the plot table 12 is otherwise a conventional x-y plot table for moving a pen assembly along the working surface of the plot table in X, Y and XY directions. The system 10 according to the present invention, however, integrates a volumetric positive displacement gear pump material delivery system which will maintain a constant volume of material per linear unit of motion within the defined speed range compensated for both acceleration and deceleration of the plot table's X, Y, XY, positive or negative X and Y movement resulting in a linear relationship between the plot movement and the material extrusion.

Conventional plot table systems are not particularly concerned with the volume of material dispensed per linear unit of motion, as is the concern here, because conventional plot tables are used merely for drawing in two dimensions where the amount of ink dispensed is not particularly important within certain limits. Here, however, in a graphic arts material extrusion device for producing decorative objects in three dimensions through the extrusion of thicotropic materials, maintaining a constant volume of material per linear unit of motion becomes particularly important.

The software utilized by the computer system 40 and the controller 36 incorporates into the relationship between the plot speed and the material extrusion activity so as to compensate for angular motion (simultaneous xy step movement) which increases the plotter's step size by approximately 40%, thereby causing an undesired plot speed increase when plotting an angular diagonal.

Motor encoders used within the plot table 12 communicate via data path 38 to the controller 36 to indicate the table's activity with motor encoders, which data is shared with computer system 40 which then directs pump activity whereby each X or Y table motor step will have a unit of one per step for either one positive X step or negative X step, one positive Y step, or negative Y step, whereas a simultaneous negative or positive XY activity will read as a unit of 1.4. This is merely because the distance of one step in the X direction and one step in the Y direction traces a diagonal line equal to the square root of 2, or 1.414, resulting in approximately a 40% increase in speed over the distance traveled. The particulars of the way in which the material dispensing compensates for angular motion providing a linear relationship between plot movement and material extrusion is discussed more fully in conjunction with FIGS. 5, 6A and 6B.

Turning now to FIG. 4, the valve assembly 32 is shown in an exploded view for illustrating the detail of its assembly and mounting upon the beam 46 of the plot table 12. A carriage tool holding plate 48 is mounted onto the beam 46 and a tool back plate 50 mounts onto the holding plate 48. An adjustable tool front plate 52 is connected to the back plate 50 via dovetail slides 54. Thumb screw 56 is used to adjust the height of the adjustable tool front plate 52. A crossed roller slide 58 is then attached to the adjustable tool front plate 52 and the roller slide 58 is air controlled, allowing valve up and valve down via an air cylinder at 60, a Humphray mini air cylinder. Four (4) needle dispensing valves 62 are mounted as parts of the valve assembly 32 as illustrated in FIG. 1.

The dispensing needle 62 shown in FIG. 4 receives material via TEFLON feedline 30 for extrusion of the material through a modified push to connect fitting 70, plastic Push-to-Connect fittings manufactured by New Age Industries (discussed further in conjunction with FIG. 9) which provides material for extrusion at the dispensing needle valve 62 (Dopag high output needle dispensing valve for abrasive materials) through a luer lock dispensing tip 72 which provides a hypodermic needle type tip for extrusion of material deposited upon object surface media 64. A Techon Systems, Inc. TS 5000 rotary microvalve positive displacement pump valve is used with valve 62. The needle dispensing valve 62 is controlled with air control signals via cables air lines 66 and 68 connected to air control valves 84, Pisco speed controller air valves, which are controlled electrically by valve plot pen control 86.

Valve status is sensed via a sensor indicating open/closed and up/down at 74. An optical sensor 76 is utilized for origin location and one of two optical distance sensors 78 is utilized for distance determinations for object thickness detection. A manifold 80 having an air line in 82 to the manifold 80 and four (4) two-way air control valves 84 controlled via valve plot pen control 86 are provided for positioning the valve assembly 32 via air control, selecting one of the four valves 62 utilized by the valve assembly 32. Latching quick clamp machine bolts 88 and 90 represent two of the four bolts utilized for connecting each of the four dispensing needle valves 62 to the boom 46.

Figure 5:
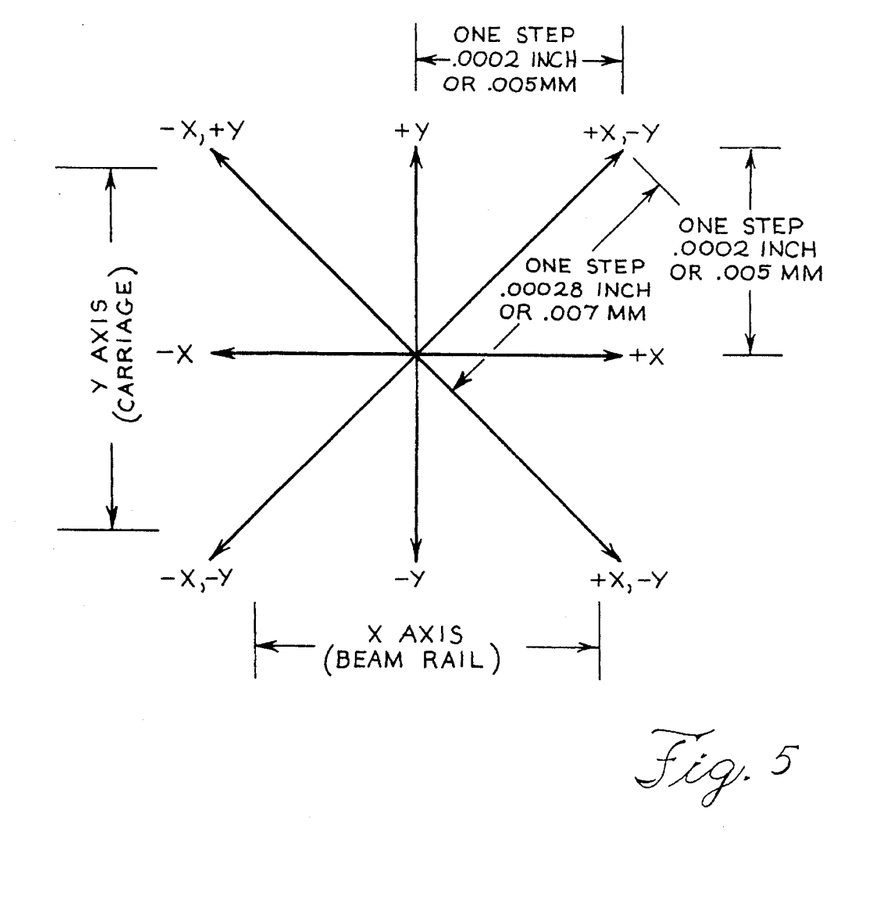
FIG. 5 illustrates the eight directions over which the nozzle of FIG. 4 may travel on the plot table of FIGS. 2 and 3 in line segments drawn through combinations of X and Y axis commands or simultaneous XY movement.
Figure 6A:
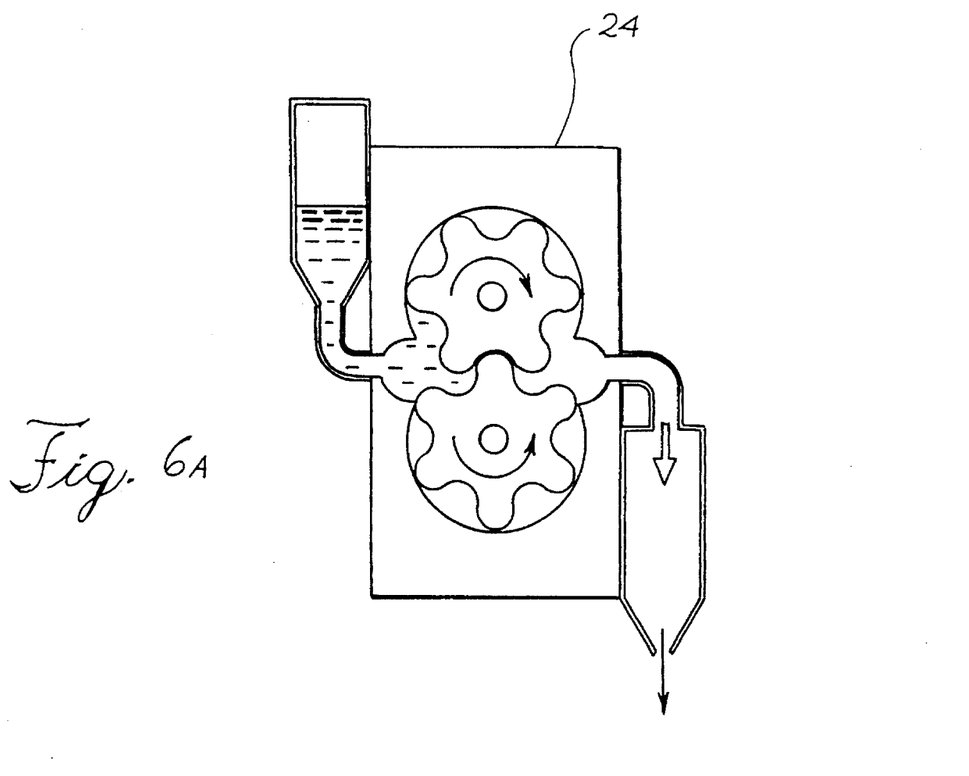
FIG. 6A illustrates a z-axis positive displacement volumetric metering pump.
Figure 6B:
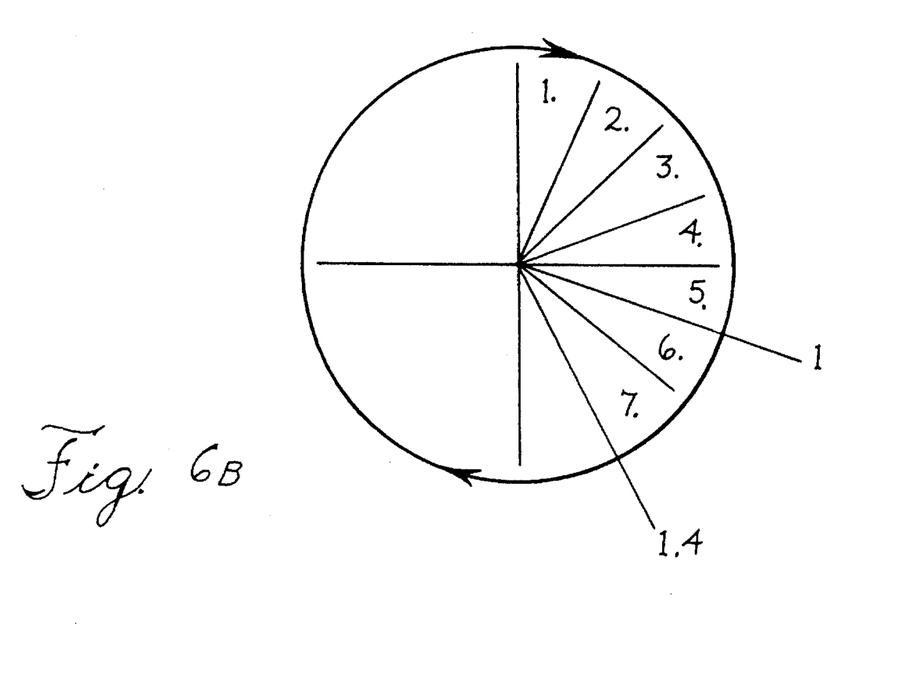
FIG. 6B illustrates five steps and seven steps of directional movement on the z-axis positive displacement volume metering pump of FIG. 6A for regulating z-axis dispensing rate according to plot speed/directional "angular" movement.

With reference to FIG. 5 and FIGS. 6A and 6B, one step of the plot table 12 in either the X or Y directions results in five steps of the pen-one, two, three and four pumps 24 which typically are NorMag extrusion positive displacement volumetric metering gear extrusion pumps (manufactured by NorMag, a Dynisco Company located in Hickory, N.C.) having temperature control and an attached motor and motor encoder, the pump gear chamber as shown in FIG. 6A produces for one unit either in the X or Y direction on the plot table 12 the resulting five units or five steps on the motor pump activity. So, one step in either the X or Y direction on the plot table 12 results in five steps of the motor and thus the pump chamber gear shown in FIG. 6A proceeds five steps of rotation to rotation step five of FIG. 6B. The five steps shown are utilized in either the +X, −X, +Y or −Y movements as shown in FIG. 5.

Diagonal movements: +X, +Y; −X, −Y; −X, +Y; +X, −Y shown in FIG. 5 result in valve movement at a speed approximately 40% greater than single X or Y movements, due to the distance traveled being approximately 40% longer in the same period of time. For these diagonal movements, a simultaneous XY step unit of 1.4 at the plot table 12 will result in seven steps at the pump motor and pump gear chamber (FIGS. 6A and 6B), thereby compensating for increased speed on angular motion at the plot table 12. As compensated, uniform Z direction material flow is achieved for all X, Y and XY combinations made on the plot table 12.

More particularly, FIG. 5 illustrates the eight directions in which line segments are drawn through combinations of X and Y axis commands. All lines and angles other than those shown and all curved lines are made up of segments drawn on these eight dimensions. Each step along either axis is 0.002 inch or 0.005 millimeters. Each step along a diagonal is 0.0028 inch or 0.007 millimeters. The step size is preset for the CalComp plot table at the factory. With respect to the plotter's speed, the speed of the plotter is determined by the number of line segments plotted in a given time period. The maximum number of segments that can be drawn in one second is 150,000. Therefore, the maximum plotting speed along an axis is 30 inches per second (150,000 steps×0.0002 inch/step) or 750 millimeters per second (150,000 steps× 0.005 millimeters/step); maximum plotting speed along a diagonal is 42 inches per second (150,000 steps×0.00028 inch/step) or 1,050 millimeters per second (150,000 steps× 0.007 millimeters).

The NorMag positive displacement extrusion pump shown in FIG. 6A compensates for z-axis dispensing rate accordingly to equalize it with the plot speed. One step −X or +X or −Y or +Y equals five steps of z-axis material displacement achieved by the z-axis positive displacement volume metering pump, pen-one pump 24. However, diagonal movement comprising combinations of +X or −X and +Y or −Y results in seven steps of z-axis material displacement. The direction of movement on pump z-axis motion is illustrated in FIG. 6B, showing five steps providing one unit of z-axis material displacement and seven steps providing 1.4 units of z-axis material displacement.

Additionally, a volumetric meter 26 provides encoder data looped into the system of pump 24 so that in software an operator can determine the desired amount of material displacement to be extruded per unit of motion. Located in the programmable software of the pumping system is the ability of the software and thus the operator to override the linear relationship between the plot motion and the material extrusion so as to modify the process for varied, creative techniques and/or increase the throughput production time whereby predetermined quantities of material are extruded in a more efficient manner than the methodical plotting and coating on a linear basis.

As an example, consider extruding a 3 inch diameter circular ridge of the thicotropic material or paste-like substance, then coating the surface inside the diameter surface area of the circle previously extruded. Such coating may be achieved through a series of hatch lines whereby the flowable extruded coating substance is eventually dispensed through the 3 inch circle. The coating may be stain or other colored lacquer material for simulating stained glass lites. In this example using hatch lines, a linear-dispensed application whereby the plot table 12 is set at a fixed rate of speed and the pump system delivers material in concert with that fixed rate of speed utilizing software and feedback to compensate for acceleration and deceleration and angular right-angled motion of the plot table movement.

Using the same example to increase productivity and thus reduce the time required for manufacture, one could program the GAME system to extrude the same circular ridge as previously discussed but then have the coating cycle time significantly decreased by instructing the material extruding valve to go to the center of the circle, open the valve with valve tip in position and then instruct the pump to extrude a predetermined volume of coating material as rapidly as possible, allowing for the material's flowable characteristics to fill in or "pot" what was previously hatched in the aforementioned example.

FIGS. 11A–D illustrate decorative objects according to the present invention wherein the ridges of lead lines define areas in the form of various decorations. These areas may be filled in with colored lacquers, etc., either by hatching or flowing such into the defined areas.

Computational fluid dynamic software is readily available in the art for modeling fluid flows with free surfaces. Such software has been found useful for filling in decorative designs with colored flowable materials. One such program is entitled Ripple, available through a government software program referred to as Cosmic. Ripple is a program which solves for two dimensional transient fluid flow with free boundaries based on the concept of a fractional volume. Its basic operation is for single fluid calculations having multiple free surfaces. Ripple software is used in conjunction with software provided for the GAME system 10 to facilitate rapid depositing of coating in delineated areas for the manufacture of faux glass decorative objects.

Figure 7:
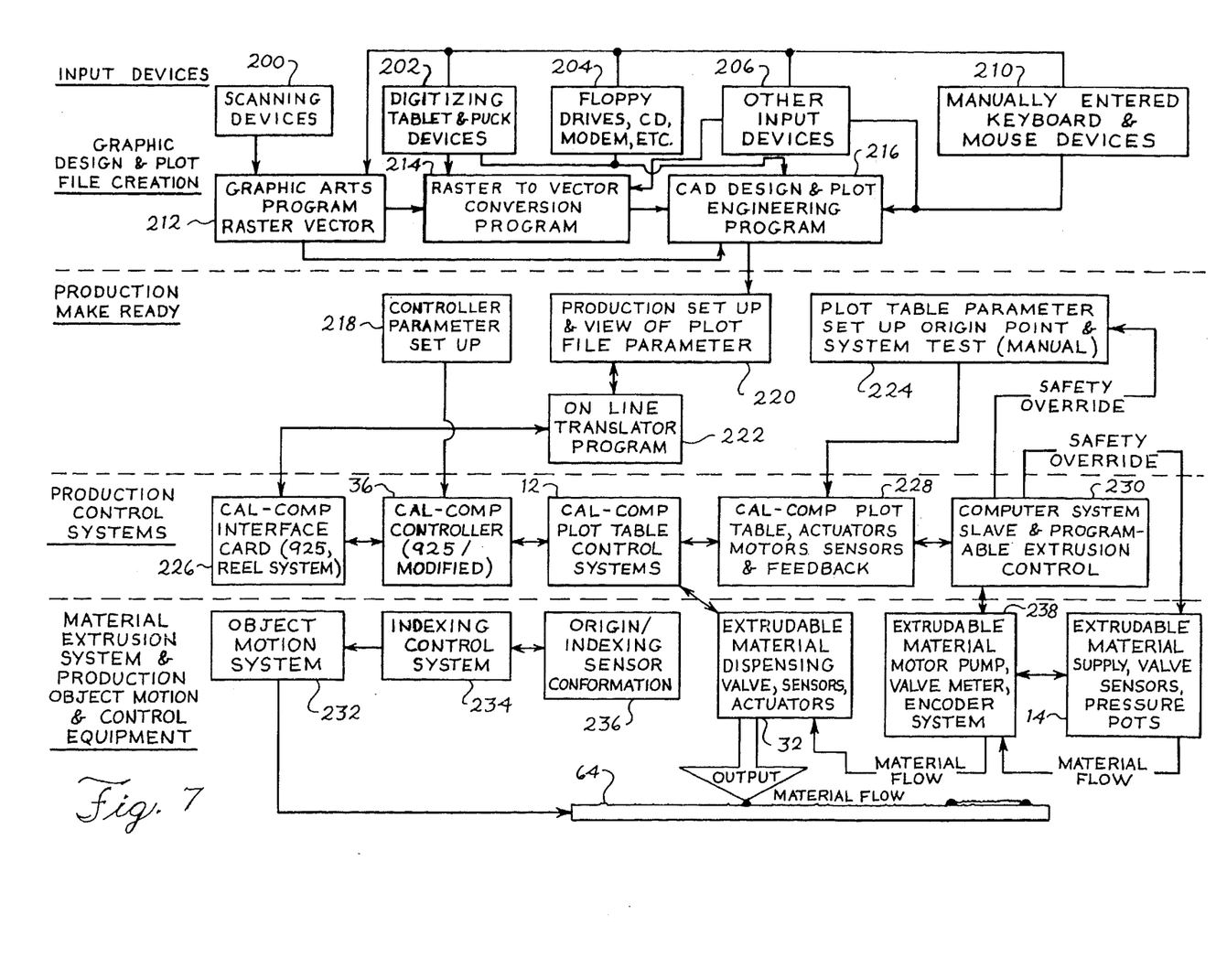
FIG. 7 is a block diagram illustrating software, devices and subsystems used in a GAME system.

As a further example of ways in which varied plot movement and material dispensing might be advantageous, the extrusion of the circular ridge described above could be further modified by the operator to have a varying amount of extruded material dispensed throughout the circular plot so as to create a wavering bead ridge as opposed to the uniform continuous bead ridge previously discussed. With reference to FIG. 7, a plot diagram for the system 10 is illustrated. Input devices refer to methods of bringing into or beginning the computer aided design phase necessary for creating an executable plot file for production of decorative multi-dimensional objects. The main computer system is set to receive graphic art information in either raster or vector formats with the goal of eventually converting such formats into a plot vector file which can be executed through the converted CalComp plot table 12 of the GAME system 10. Scanning devices 200, such as optical scanners, may be utilized for input whereby graphic arts software is provided on computer 42, allowing scanning of images for rendering as decorated objects. Other input devices include digitizing tablet and plot devices 202, floppy drive CD and modem inputs 204 and other input devices 206 and manually entered keyboard and mouse device commands 210. The input data from the various input devices is filed in the CAD program of computer 42 and duplicated in a second CAD plot file. The input plot file arrives to the CAD program where it is created directly in the CAD program or first gets processed through either a raster graphic program, vector graphics program or through a conversion raster/vector program for later use by the CalComp controller 36.

Graphic design and plot file creation is then performed once input data is provided. This may be viewed in a pre-plot file state where graphic design may be manipulated or created in raster or vector formats. In the case of raster formats, the raster graphic must then be converted to a vector format before being read by the CAD system for final rework and plot file allocation. Alternatively, if a raster file is used with the CAD system, it would be used as a sub-layer in which a vector format graphic is traced thereover.

The CAD system takes its input either through various graphics development programs, graphic arts program raster/vector 212; graphics conversion program 214; also a CAD design and plot engineering program 216 is provided for direct on-line file creation through input devices or by receiving CAD-ready transfers of graphic designs via 204 or 206.

After a vector format graphic is input and a plot file is created, allocating the production ready file to the plot file program located in the production setup software, production setup in view of plot file program is provided. This is designed to set up the layout of the production project on-screen so the operator can see the design prior to its execution. A graphical image of the plot table, the frame size of each object to be placed thereon, the number of frames and their location on the table, data indicating frame size and the graphic design to be plotted within designated frames is presented to the operator. The program further allows for step and repeat of designs, thereby limiting file sizes to one object file even though several may be produced on the plot table 12.

The plot files are located at a translator program which makes the plot file instructions executable through the modified CalComp plot table system is provided under software control. On-line activity is provided between the plot file and the CalComp plot controller 36. As illustrated in the plot diagram of FIG. 7, a controller parameter setup is provided at 218, production setup and view of plot file parameters is provided at 220 for use with computer system 42. The on-line translator program is indicated at 222. At 224 manual plot table parameter setup origin point and system test is provided with auto and manual safety override control.

The on-line translator program 222 is the translator program which talks to the interface card located in the CalComp plot table controller. As previously discussed, the function of this interface card is to eliminate the original reel-to-reel tape system in which the CalComp controller read its instructions that originally were downloaded, addressed and stored. The interface card as discussed upgraded this obsolete system through the use of a computer system 42 interfacing to the controller 36. The CalComp interface card as discussed is illustrated at 226 in FIG. 7. The production control system box of FIG. 7 illustrates the way in which the CalComp interface card 226 communicates with the CalComp controller 36, which subsequently communicates with the CalComp plot table 12. Further interface to the CalComp plot table 12 are CalComp plot actuators, sensors and feedback 228 and computer system slave programmable extrusion 230 having an automatic safety override.

As illustrated, automatic safety overrides originate from the computer system and slave programmable extrusion 230. One such manual safety override is provided to plot table parameter setup origin point and system test 224. The manual plot table parameter setup origin point and system test 224 is a manual plot table 12 keyboard control and switches associated therewith for testing plot table dispensing rate, valve height and general system verification. The origin location is manually set by arrow buttons directing the plot head to the required index points. Features such as vacuum hold-down and interrupt plot functions occur here for plot table maintenance. The safety override is manually executed here if there is a production failure. Therefore, the modified pump subcontrol system and its sensors will feed back error data through its subcontroller and automatically halt the production until operator maintenance can occur to rectify the error condition.

The CalComp plot table actuators, motor and feedback 228 refer to the X and Y motors, its accelerometers and other sensors, encoders, etc. The original CalComp system has been modified to accept feedback loops and have such feedback dictate an added z-axis volumetric pump extrusion and valve system which replaces the former liquid ink pressure system. The z-axis displacement system, as discussed above in conjunction with FIGS. 5 and 6, as should be appreciated, provide the added Z dimension required for producing multi-dimensional decorative objects.

Material extrusion system and production object motion and control equipment is provided as follows. An object motion system 232 is utilized to position the surface 64 to be decorated by the GAME system 10. The object motion system 232 is controlled by an indexing control system 234 which obtains current and indexing information from an origin/indexing sensor confirmation block 236, operating in conjunction with the CalComp table control systems of the plot table 12. Pressure pot 14 is represented in the block of FIG. 7 comprising extrudable materials supply valve sensors and pressure pots 14. An extrudable material motor pump valve meter encoder system 238 monitors the extrudable material from the pressure pot 14, controlling material flow to extrudable material sensing valve sensors actuators of the valve system 32.

The computer system 40 acts as a slave and programmable extrusion control for the controller 36 and is an IBM compatible personal computer system modified to function as a slave or subcontroller to the controller 36 and thus the computer 40 is a slave to the plot table 12 to control plot table motor and actuator activity.

Figure 8:
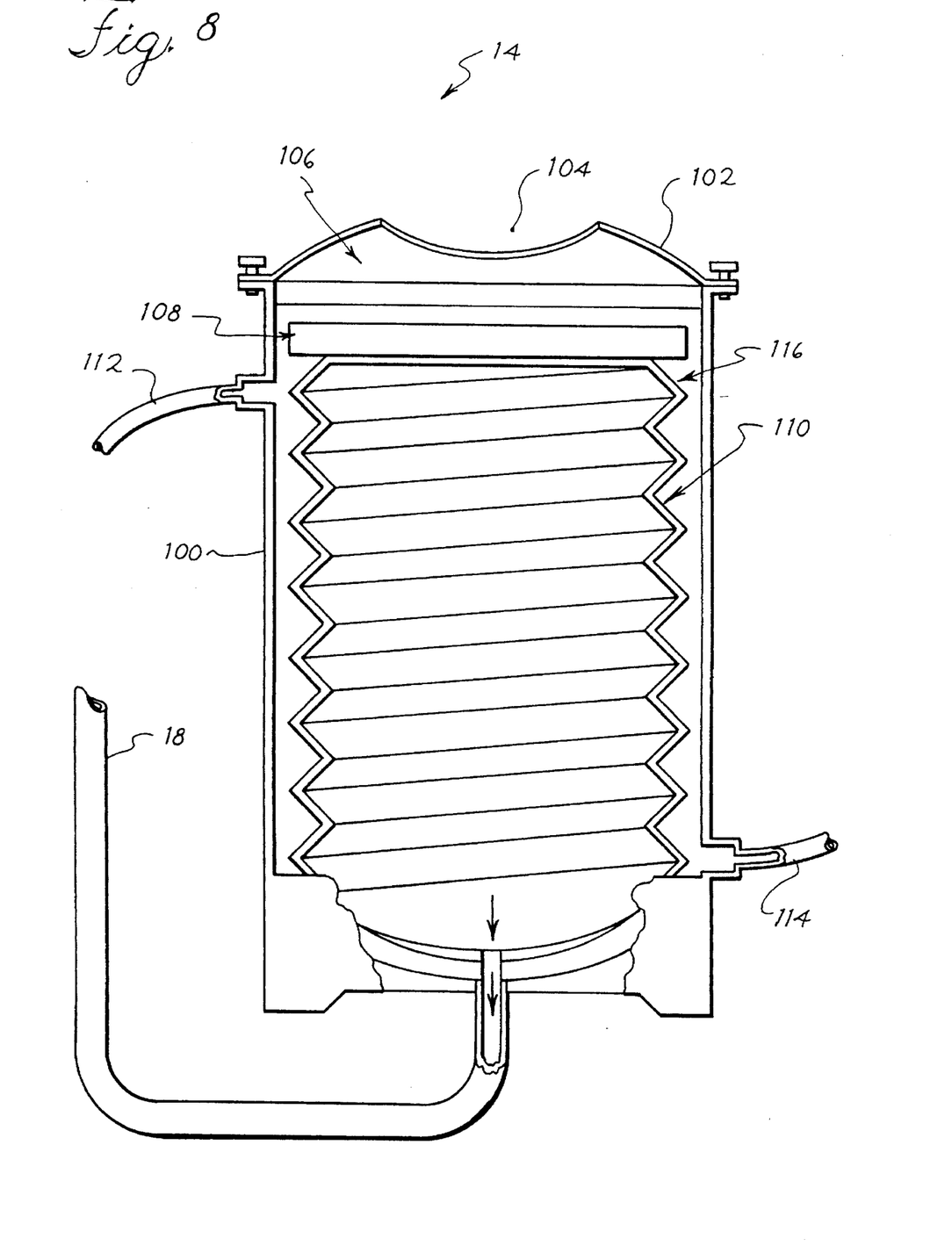
FIG. 8 illustrates a pressure pot material transfer system in cross section.
Figure 9:
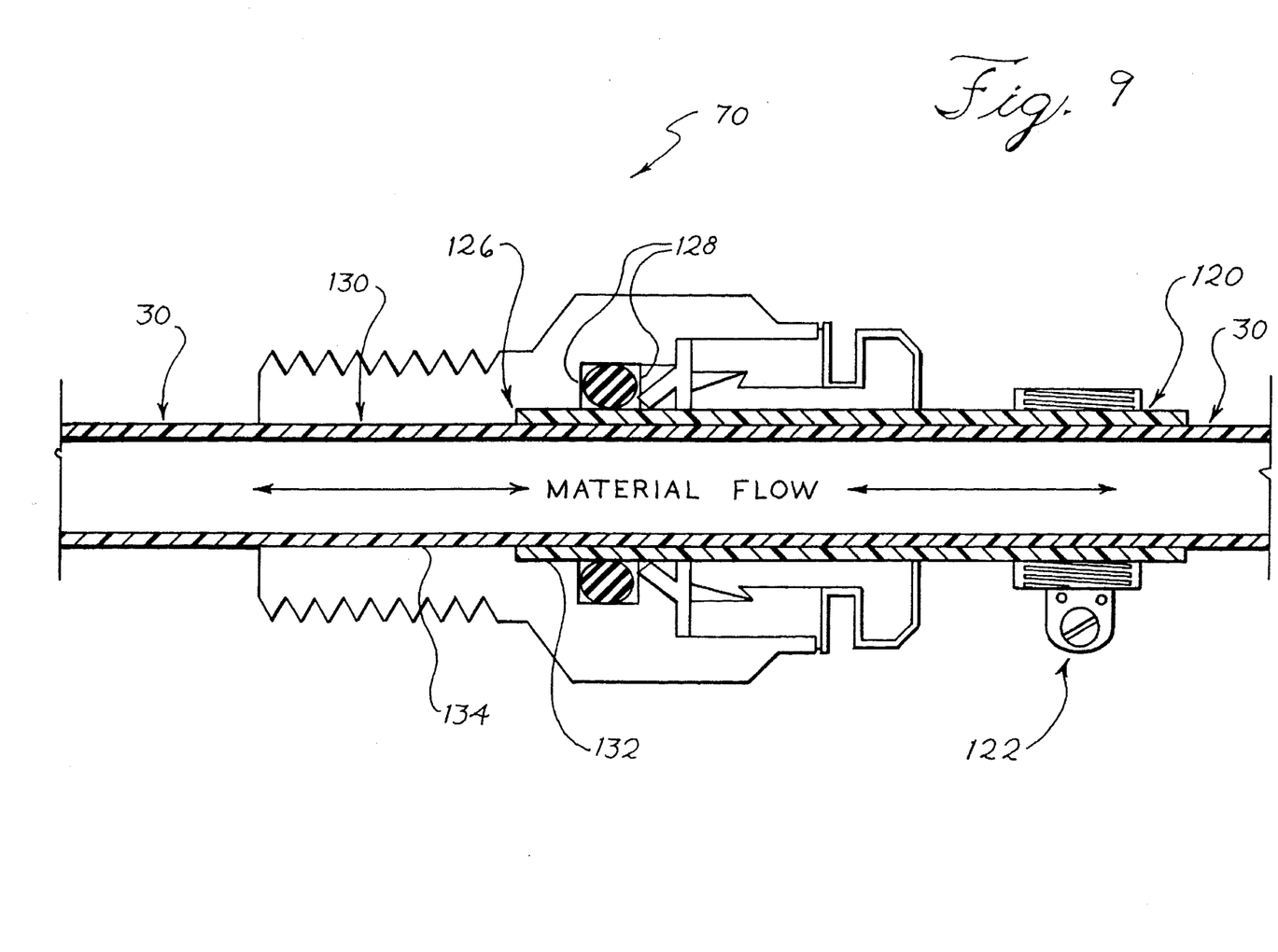
FIG. 9 is a cross-sectional view illustrating a modified use for a push lock or a press lock tube coupling for use within an embodiment of the present invention.

The pressure pot 14 of FIG. 8 shows in cross-section one of two pressure pot supply systems for each valve dispensing head or twice as many in the case of two component blended material formulas. Generally a single pressure pot is all that is required for each head unless the material must be temperature conditioned prior to extrusion, in which case the main pressure pot supply would feed a second temperature conditioning pressure pot. This two step pressure pot system minimizes the amount of material to be conditioned to the amount needed on demand. This system has fill sensors, pressure indicators and safety shutoff valves controlled through the safety override subcomputer system. Pressurized material from the pressure pot system flows to the above described motor pump and meter system.

Extrudable material dispensing valve sensors and actuators are the output end of the material pump system located at the plot head which moves across the X and Y plane. The system features several dispensing valves, valve assembly 32, which are pressure opened and closed. The valves hang on a crossed roller slide which is motion controlled by an air actuated cylinder, as discussed in conjunction with FIG. 4. Various sensors report proper valve location, valve condition (open/closed, etc.) prior to pump movement and extrusion. As previously discussed, the plot head and valve assembly 32 has optic sensors to coordinate manual position of the valve origin or object origin setup. Other information reported back to the main CalComp control system upstream of the subcontrol system is provided so as to prevent a system interrupt safety override response and instead, delays plot execution until all valve interactions are ready.

The pressure pot 14 for material transfer and extrusion is shown in cross-section in FIG. 8. The pressure pot 14 consists of a container 100 and a lid 102 having an access hole 104, manufactured by Alloy Products Corp., ASME 316 stainless steel pressure tank. An air pressure chamber is provided at 106 under the lid 102. A weight 108 comprising a steel disk pushes downwardly upon a material bladder 110 having a bellows type screw profile, as illustrated.

Temperature controlled water is pumped into the pressure pot 14 via inlet 114. As indicated, the water flows outside the bellows screw profile upwardly and outward from water outlet 112. Pressurized material within the bellows type material bladder 110 is forced outwardly from the bellows at the bottom thereof via a Pureloc TEFLON tube fitting and the TEFLON feed tube which is made of TEFLON lined braided metal and connected to the bladder of the pressure pot via a seamless quick connector, as discussed in conjunction with FIG. 9. Turning now to FIG. 9, to facilitate material flow which has a high particle make-up, a continuous feed line without seams was found necessary because any coupling interface will result in caking or eventual build-up of material at junction points. A modified coupling is illustrated in FIG. 9, allowing for fast and easy removal of sacrificial feed line through a quick-connect type coupling system. Plastic push-to-connect fittings and TEFLON chemical tubing are used.

Known prior art quick-connect systems have two limitations. First, there is a seem joint and second, pressure limits restrict high viscosity, high pressure use. The following modified use has been devised to overcome these limitations. At 120, where quick-connect tubing is originally designed to be placed, in prior art systems results in a tube coupling connection seam at 126. Furthermore, under high pressure the seam 126 allows material to contaminate and weep into a chamber 128 housing an 0-ring.

The modified use for the quick-connect coupling requires that the desired seamless feed through tube 30 have a tube size that can be used in combination with a larger sized coupling tube 120, whose inside diameter acts as a sleeve to fit tightly over the inner feed tube system of TEFLON feed tube 30, as illustrated. By installing the inner feed tube 30, having no seams therein, a completely seamless coupling is achieved and further, the elimination of seams facilitates coupling of high pressure substances, avoiding seepage at 126. The coupling illustrated in FIG. 9 has a pressure load limit of 125 pounds whereas the feed line pressure limit exceeds 300 pounds. Thus, by modifying the coupling assembly as illustrated in FIG. 9, the coupling connection is now as great or greater than the feed line limit, exceeding 300 pounds without the possibility of any chamber seepage. The inner tube 30 which extends completely through the coupling, having a diameter equal to the inner diameter of the outer tube 120 and the inner diameter of the coupling end at 130, prevents any caking or other build-up of material at the coupling. When tested, the pressure range of the coupling at 134 has been found to even exceed 300 pounds, using the two tube system shown. In the standard coupling setup, using only tube 120, it was found that at point 132 only 125 pounds of pressure was sustainable. This illustrates a marked improvement in pressure which may be sustained at the coupling. To further secure the tubes 30 and 120, a metal band screw clamp 122 is used for high pressure applications.

With respect to particular tube size, the outside tube is preferably TEFLON ½ inch outer diameter, ⅜ inch inner diameter tubing approximately 3 to 6 inches in length and the inside tubing is preferably TEFLON ⅜ inch outer diameter, ¼ inch inner diameter and the tube length goes from start of system to end of system, providing a continuous seamless run therebetween. The coupling is illustrated for use at the plot head dispensing tool of the valve assembly 32 generally at 70, as shown in FIGS. 4 and 9. However, the same type of modified coupling is also employed in the pressure pot 14 of FIG. 8.

The described modified use of the push-lock or press to lock quick-connect couplings providing a larger coupling so as to allow for a larger sleeve tube and a correct size inner tube to pass completely through the fitting, thereby becoming seam free and allowing for greater pressures, has additional advantages such as the ability to keep the coupling clean and free from extraneous material. Removal of the line couplings occur just as originally intended with the additional benefit that, upon removal, the coupling inside screw wall at 130 will not have come in contact with any material flow nor will the chamber 128 have any material therein as already discussed, thereby eliminating clean-up of couplings between material changes.

Figure 10A:
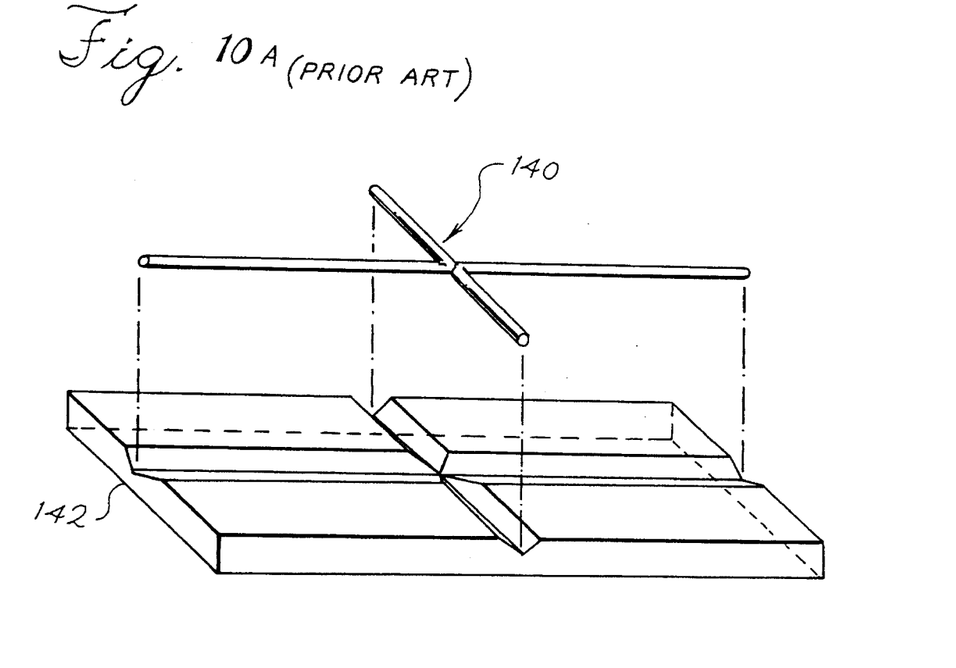
FIG. 10A illustrates the prior art fake came grid overlay for use with flat glass having a machined V-notch groove or bevel.
Figure 10B:
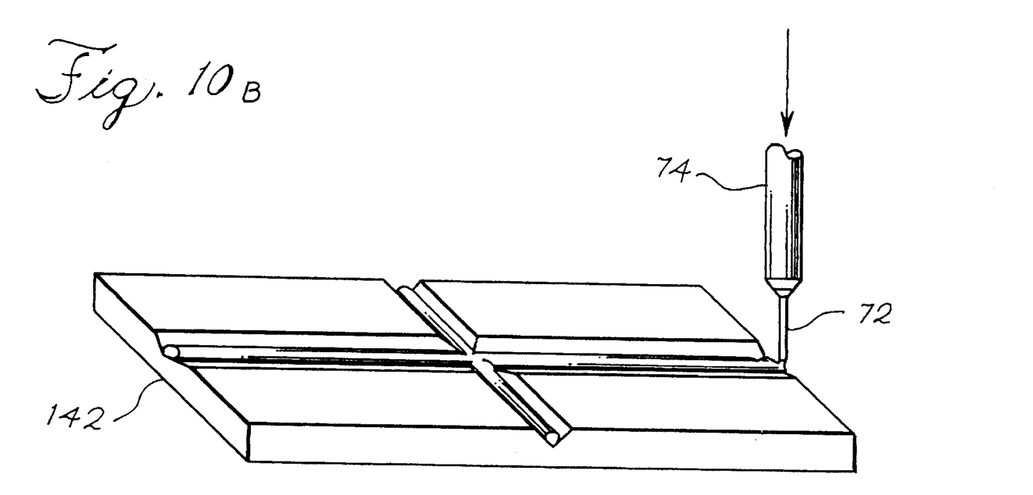
FIG. 10B illustrates direct deposit of extruded material onto flat glass having a machined V-notch groove for a faux beveled cluster and metal came produced by the GAME process.
Figure 10C:
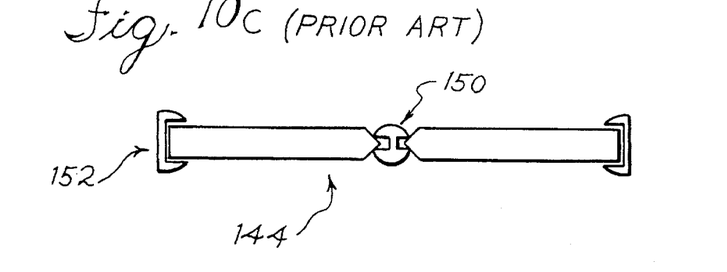
FIG. 10C illustrates true metal beveled came assemblage of small separate beveled glass units welded together with metal came.

Turning now to FIGS. 10A–F, prior art techniques and methods according to the GAME system are illustrated. Stained glass and beveled glass panels are typically made up of many pieces of leaded or beveled glass lites which are surrounded by a complex metal came framing system soldered or welded into an interlocking network of frames that structurally hold the various pieces of glass lites into a single unified panel of glass. A simplified view of this system is shown in FIG. 10C which shows two glass lites 144 side-by-side with the inside edge beveled at both its top and bottom. Between these lites is shown an end cutaway view of a metal came bar 150 which has a profile similar to an I-beam. Inside the channel of the I-beam shaped came bar is room for the two glass lites to be interlocked in place. By continuing the process of surrounding the glass lites with additional bars of channeled metal cam on all sides, a complete frame is constructed which, when welded together at its ends 152, will encapsulate the glass lite edges, holding them all in place.

Since this construction process is labor intensive, many manufacturers have sought other methods of replicating the look of stained or beveled glass construction by means of less labor intensive methods, allowing for less expensive look-alike products as illustrated in the prior art assembly process of FIG. 10A wherein a fake came is a grid overlay 140 and the fake beveled cluster uses large flat glass 142 having a machined V-groove or notch therein. The grid overlay is used to fake a true, hand leaded, true beveled cluster as shown in FIG. 10C. In the exemplary fake came grid structure of FIG. 10A, a large glass lite is machined ground with a V-notch groove trench to create the true beveled glass look, but rather than fully beveling the glass into separate glass lite pieces the glass is left whole and a second prefabricated fake came frame is laid on top of the V-notched groove in the glass panel, emulating the appearance of a true metal came structure.

Figure 10D:
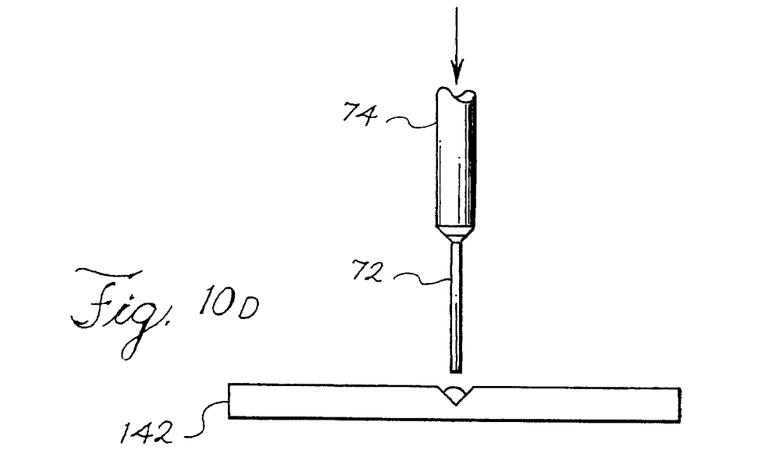
FIGS. 10D and 10E illustrate single lite flat glass having a one-sided V-notch groove and two-sided V-notch grooves respectively machined therein, showing extruded faux came material according to the present invention.
Figure 10E:
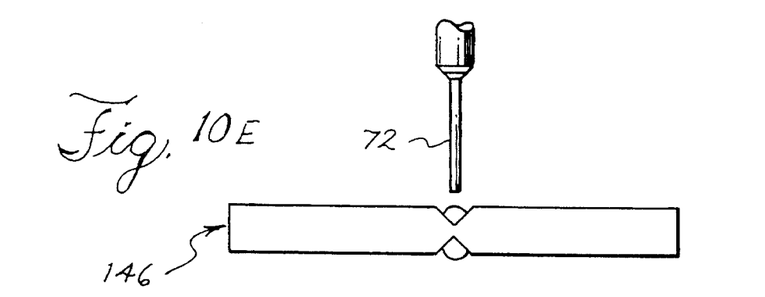

The GAME system 10 is capable of providing the same illusion of a came system without the tooling expense or inventory maintenance of the prefabricated grid system of FIG. 10A. The GAME approach to the fake came overlay is illustrated in FIGS. 10D and 10E, showing single and double-sided overlay with the glass lite left whole. More particularly, the single-sided single lite 142 has material deposited in accordance with the invention in the groove illustrated via the dispensing tip 72. The double-sided single lite 146 provides material dispensed on both sides wherein the groove does not cut completely through the glass on either side. The GAME system and method as shown in FIG. 10B is a perspective view of the cross-sectional view illustrated in FIG. 10D, wherein material is extruded directly onto the V-notched groove providing a beam of metallic came-like material which then, as in FIG. 10D, rests atop and forms a metal came structural shape as viewed from above. FIG. 10E illustrates that the same process may be employed for both sides of a single lite 146, providing a more convincing look. It should be appreciated that the Use of the high bond strength material deposited also provides additional support for the cut glass.

Figure 10F:
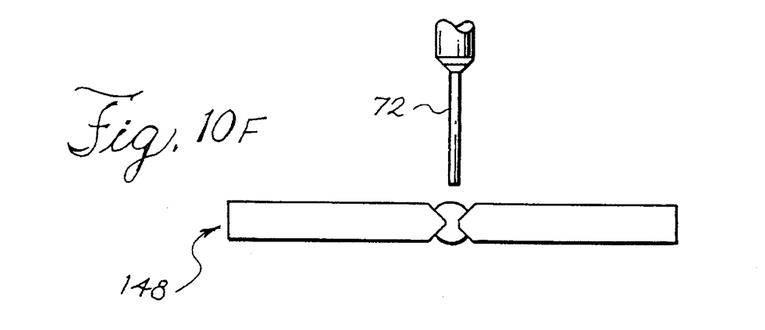
FIG. 10F illustrates a process according to the present invention using the GAME system which can replace a true structural metal came with high bonding extruded material which will hold glass lites as well as or better than lead or zinc metal came.
Figure 11A:
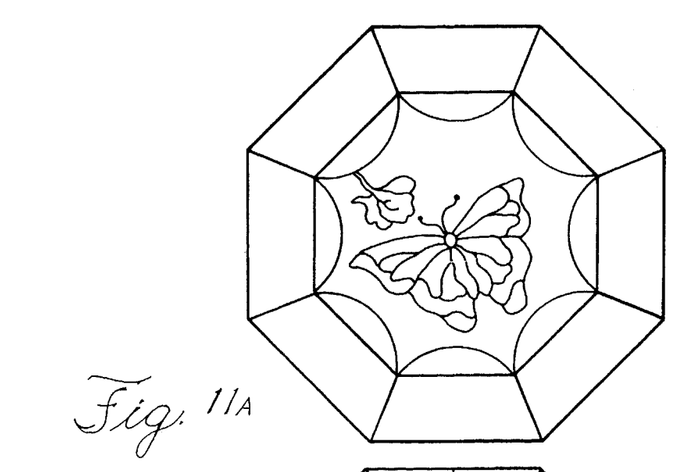
FIGS. 11A–D illustrate exemplary graphic art designs developed according to the present invention for graphic arts material extrusion.
Figure 11B:
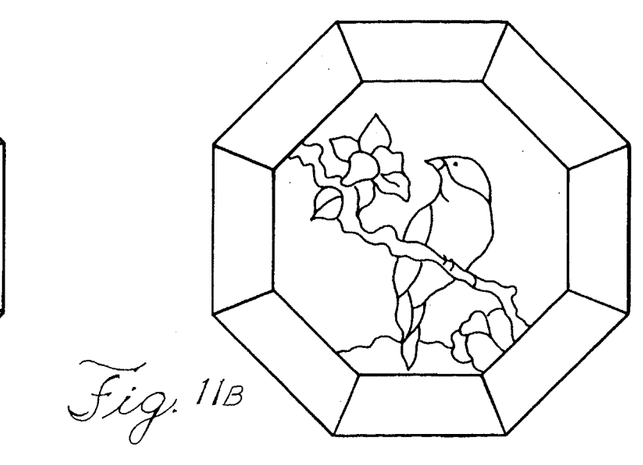
Figure 11C:
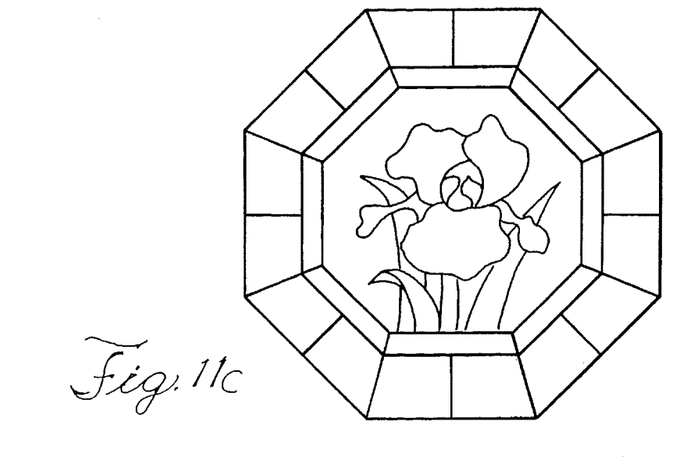
Figure 11D:
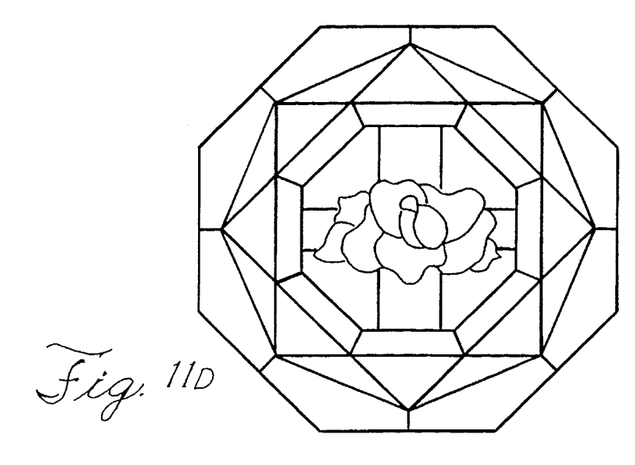

In FIG. 10F, by use of high bonding strength extrudable material, the GAME system 10 can go beyond a faux decorative application and be utilized with a true, fully beveled and separate stained glass lites by forming a direct on-site deposit of extrudable structural frame material providing a superior and easily assembled decorative glass piece. The epoxy material used, by its very nature, works well for holding together the glass lite pieces 148 of FIG. 10F.

FIGS. 11A–D illustrate designs using false lead lines. Materials used in accordance with the present invention for false bead metal lines or lead lines include a product known in the trade as Glass Texture, sold by Jurgen Craft Products, Everett, Wash. Glass Texture is a white, water-based medium which gives added dimension to a stained glass project. Glass Texture dries clear but somewhat translucent due to texture. Drying time is over night and Glass Texture is applied with a generous coating, typically using a flat #10 brush. The use of a chisel edge of the brush and pat to produce a rough surface may be desirable for the intended use for Glass Texture. The Glass Texture product is also sometimes referred to as liquid texture.

Glass Texture is believed to be a polyester or acrylic based coating dispersed in water. Though a viscous material, Glass Texture itself is not a particularly thicotropic material. It has been discovered that addition of a pigment or particles to the Glass Texture product adds thicotropic properties to the Glass Texture, allowing it to be used as a liquid metal bead substance for creating, for example, false lead lines for use in a faux stained glass decorative object. Though any pigment in and of itself is generally sufficient for adding thicotropic properties to the Glass Texture, the thicotropic agent, in addition to pigment, may also be desirable although not necessary.

It has been found further desirable to remove excess water from the Glass Texture product to reduce shrinkage during drying and create a more convincing look for the false lead lines created thereby. A device known in the art as a rototherm evaporator is typically used to remove the water from the Glass Texture, such rototherm evaporator equipment is manufactured by Artesian, Inc.

It has also been found desirable to replace the removed water with a non-aqueous medium such as poly-glycol. The use of too much poly-glycol, however, has the negative effect of reducing the adhesive qualities of the Glass Texture. Where shrinkage is desired for a stylized look it may be desirable to leave the excess water in the Glass Texture.

Alternatively, other substances found to be very desirable for creating false metal lines or lead lines are commercially available single component, bake-on no-drip epoxies. Such bake-on epoxies have been used for adhesives and for potting various components to avoid tampering. However, the present invention has found a unique use for such epoxies as false metal bead lines when proper pigments are added. In addition to adding pigments, it has been found desirable to add capasil or fume silica to thicken the epoxy and add thicotropic properties. Additionally, vulcanized rubber has been added to the epoxy to provide added flexibility.

While the Glass Texture as modified for use as lead lines may air dry over a time period of approximately one day, the bake-on epoxies must be heated to temperatures of about 200° F. to 250° F. for drying the epoxies. This typically takes 30 minutes to an hour. Thus, while the epoxy requires an additional step, the process time is shortened significantly.

Once a desired lead line material or other liquid metal material for false metal bead lines is selected, it has been found desirable to remove air from the material with a device known as a Cornell versator deaeration equipment, which uses centrifugal force and vacuum to deaerate substances. Then the liquid metal material is pressurized in the pressure pot 14 for use in the system 10, as described above.

An advantageous drying system, when using the bake-on epoxy adhesives, is the Sunkiss infrared drying system which uses infrared lamps and gas propane to heat up an element for post-production drying and material curing. With the Sunkiss system the drying cycle is carried out between 200° F. and 250° F. for 6 to 7 minutes for paint or lacquers for staining glass, or for up to a half-hour or an hour for thicker lead line material. The drying time required is, of course, proportional to the thickness of the material being dried but generally for decorative false stained glass objects having thick barrier lines, an hour is the typical time for drying using the Sunkiss system.

With respect to pigments and materials which may be added to any of the above described adhesive false metal materials, there is a great deal of room for creativity. For example, pigments may be combined to develop new looks or different metal colors for the bead line to be applied to the glass. Also, powdered metals may be used. For example, it has been found desirable to use powdered stainless steel to give a cast iron look.

Another way of producing a false metal line is through the use of a powdered metal pigment such as brass which, when combined with a cyanoacrylate glue, reacts in part due to the stearic acid by-product found on the bronze powder to accelerate the drying time of the cyanoacrylate glue. As a result, the combination of the pigment and cyanoacrylate glue dries almost instantaneously as the glue is dispensed from the nozzle and the chemical reaction which takes place with the powdered metal pigment gives a gloss or high optical finish generally found in an epoxy material. It has been found that in the reaction the metal particles force their way to the surface of the bead line, flattening out to give a highly reflective appearance. Further, it has been found that the described reaction with the cyanoacrylate glue results in an adhesive material which adheres well to the glass or other surface making up the decorative object.

When the cyanoacrylate glue-powdered metal reaction takes place, additional ventilation is required to take away the smoke that results. This is also particularly so when powdered aluminum is put into the cyanoacrylate glue. The reaction produces oxygen, keeping the cyanoacrylate glue flowable. However, at the tip head where the chemical reaction takes place, a great deal of heat and smoke is generated.

The above description of the present invention was directed to graphic arts material extrusion, including methods or processes, the decorative objects produced thereby, and systems, devices and apparatus for the production of such objects. It will be apparent to those skilled in the art that the present invention encompasses other means of carrying out the invention. Accordingly, various modifications to the present invention will become apparent from the above description and accompanying drawings and the present invention is to be limited solely by the scope of the following claims.

What is claimed is:

1. A graphic arts material extrusion device comprising:

a plot table means for supporting a surface below a nozzle to be decorated thereby;

a container for maintaining a thicotropic substance under pressure;

a displacement pump connected to said container for extruding metered amounts of the thicotropic substance;

a nozzle connected to said displacement pump for extruding the pressurized thicotropic substance;

a seamless connection at said container comprising polytetrafluoroethylene tubing passing continuously through a sacrificial tube which resides within a modified press lock tube coupling connected to said container, the tubing connecting said container to said displacement pump and said nozzle; and said plot table means having means for mounting said nozzle such that it controls said nozzle and the surface with respect to movements in a first X direction and in a second Y direction along the surface, said nozzle depositing the thicotropic substance on the surface in multiple dimensions.

2. A device in accordance with claim 1 wherein said container comprises a pressurized screw-type bladder.

3. A device in accordance with claim 1 wherein said nozzle comprises valves ther0eon for inhibiting the extruding of the pressurized thicotropic substance therethrough.

4. A device in accordance with claim 1 further comprising a computer interfaced with said plot table means for controlling said plot table means.

5. A device in accordance with claim 4 wherein said computer further comprises fluid dynamic software for determining flow characteristics of materials pumped through said nozzle allowing a predetermination of the amount of the thicotropic substance to be extruded therethrough whereby the thicotropic substance is extruded in two dimensions on the surface.

6. A device in accordance with claim 1 wherein said displacement pump provides a continuous feed of said pressurized thicotropic substance through said displacement pump and said nozzle.

7. A device in accordance with claim 6 wherein said displacement pump provides the continuous feed of the pressurized thicotropic substance through said displacement pump and said nozzle along a diagonal combined X Y direction at a rate of 40% greater than the rate for extruding the thicotropic substance when extruding in X and Y directions individually.

8. A graphic arts material extrusion device comprising:

a plot table means for supporting a surface below a nozzle to be decorated thereby;

a container for maintaining a thicotropic substance under pressure;

a nozzle connected to said container for extruding the pressurized thicotropic substance;

a seamless connection at said container comprising polytetrafluoroethylene tubing passing continuously through a sacrificial tube which resides within a modified press lock tube coupling connected to said container, the tubing connecting said container to said nozzle; and said plot table means having means for mounting said nozzle such that it controls said nozzle and the surface with respect to movements in a first X direction and in a second Y direction along the surface, said nozzle depositing the thicotropic substance on the surface in multiple dimensions.

9. A device in accordance with claim 8 wherein said container comprises a pressurized screw-type bladder.

10. A device in accordance with claim 8 wherein said nozzle comprises valves thereon for inhibiting the extruding of the pressurized thicotropic substance therethrough.

11. A device in accordance with claim 8 further comprising a computer interfaced with said plot table means for controlling said plot table means.

12. A device in accordance with claim 11 wherein said computer further comprises fluid dynamic software for determining flow characteristics of materials pumped through said nozzle allowing a predetermination of the amount of the thicotropic substance to be extruded therethrough whereby the thicotropic substance is extruded in two dimensions on the surface.

\* \* \* \* \*